United States Patent [19]
Kunihiro et al.

[11] Patent Number: 6,021,336
[45] Date of Patent: *Feb. 1, 2000

[54] PORTABLE COMMUNICATION TERMINAL CAPABLE OF TRANSMITTING TEXT DATA

[75] Inventors: Takushi Kunihiro; Fukuharu Sudo, both of Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,589

[22] Filed: Jul. 19, 1996

[30] Foreign Application Priority Data

Jul. 21, 1995 [JP] Japan .................................. 7-207719

[51] Int. Cl.⁷ .................................................. H04M 11/00
[52] U.S. Cl. .......................... 455/575; 455/31.3; 455/412
[58] Field of Search ........................... 455/575, 90, 31.3, 455/412

[56] References Cited

U.S. PATENT DOCUMENTS

| | | | |
|---|---|---|---|
| Re. 35,343 | 10/1996 | Shimada et al. | 360/71 |
| 4,427,848 | 1/1984 | Tsakanikas | 379/110 |
| 4,799,254 | 1/1989 | Dayton et al. | 379/97 |
| 4,962,377 | 10/1990 | Wallace et al. | 455/31.2 |
| 5,249,220 | 9/1993 | Moskowitz et al. | 379/93 |
| 5,351,235 | 9/1994 | Lahtinen | 370/58.1 |
| 5,379,340 | 1/1995 | Overend et al. | 379/93 |
| 5,473,143 | 12/1995 | Vak et al. | 379/93 |
| 5,479,472 | 12/1995 | Campana, Jr. et al. | 379/58 |
| 5,526,411 | 6/1996 | Krieter | 379/110 |
| 5,581,599 | 12/1996 | Tsuji et al. | 379/63 |
| 5,588,009 | 12/1996 | Will | 455/31.3 |
| 5,638,346 | 6/1997 | Aramaki | 369/32 |

FOREIGN PATENT DOCUMENTS

| | | | |
|---|---|---|---|
| 0463856 | 1/1992 | European Pat. Off. | H04M 1/72 |
| 0693860 | 1/1996 | European Pat. Off. | H04Q 7/32 |
| 2283597 | 5/1995 | United Kingdom | H04B 5/04 |
| 9310618 | 5/1993 | WIPO | H04M 11/00 |

*Primary Examiner*—David R. Hudspeth
*Assistant Examiner*—Daniel Abebe
*Attorney, Agent, or Firm*—Jay H. Maioli

[57] ABSTRACT

A portable communication terminal capable of forming and transmitting text faster and easier than conventional terminals including input devices for selecting an operating mode of the portable communication terminal and for entering alphanumeric symbols, a display for displaying the symbols and a cursor, a memory for storing previously chosen text data, and control circuitry for displaying in the display a user selected one of the previously chosen text data stored in the memory, and for inserting alphanumeric symbols input by the user into fixed positions of the selected text before transmitting the combined text.

6 Claims, 4 Drawing Sheets

PORTABLE COMMUNICATION TERMINAL CAPABLE OF TRANSMITTING TEXT DATA

BACKGROUND OF THE INVENTION

1. Field of the Invention

This invention relates to a portable communication terminal capable of transmitting text data.

2. Description of the Related Art

Nowadays, some devices are provided with an electronic mail function capable of transmitting text data made of comparatively simple sentence between terminals in a portable telephone system. When using this function, a user generally inputs the whole transmission sentence by means of an input device such as a ten-key pad.

By the way, in the case of a portable telephone, the number of keys usable for input is limited and keys are small, thus it is troublesome and time consuming to input even a simple sentence.

SUMMARY OF THE INVENTION

In view of the foregoing, an object of this invention is to provide a portable communication terminal capable of transmitting text data in which a sentence can be transmitted more speedily and easily than in a conventional terminal.

The foregoing object and other objects of the invention have been achieved by the provision of a portable communication terminal capable of transmitting text data comprising input means used for selecting the operation of said portable communication terminal and inputting letters; display means capable of displaying at least letters and a cursor; storage means for storing a plurality of specific text data; and control means for displaying text data selected from said plurality of typical pattern text data stored in the storage means by said input means on said display means, and inserting the letters which are inputted by said input means into a predetermined position of said text data displayed to complete a transmission text data.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Construction

Figure 1:
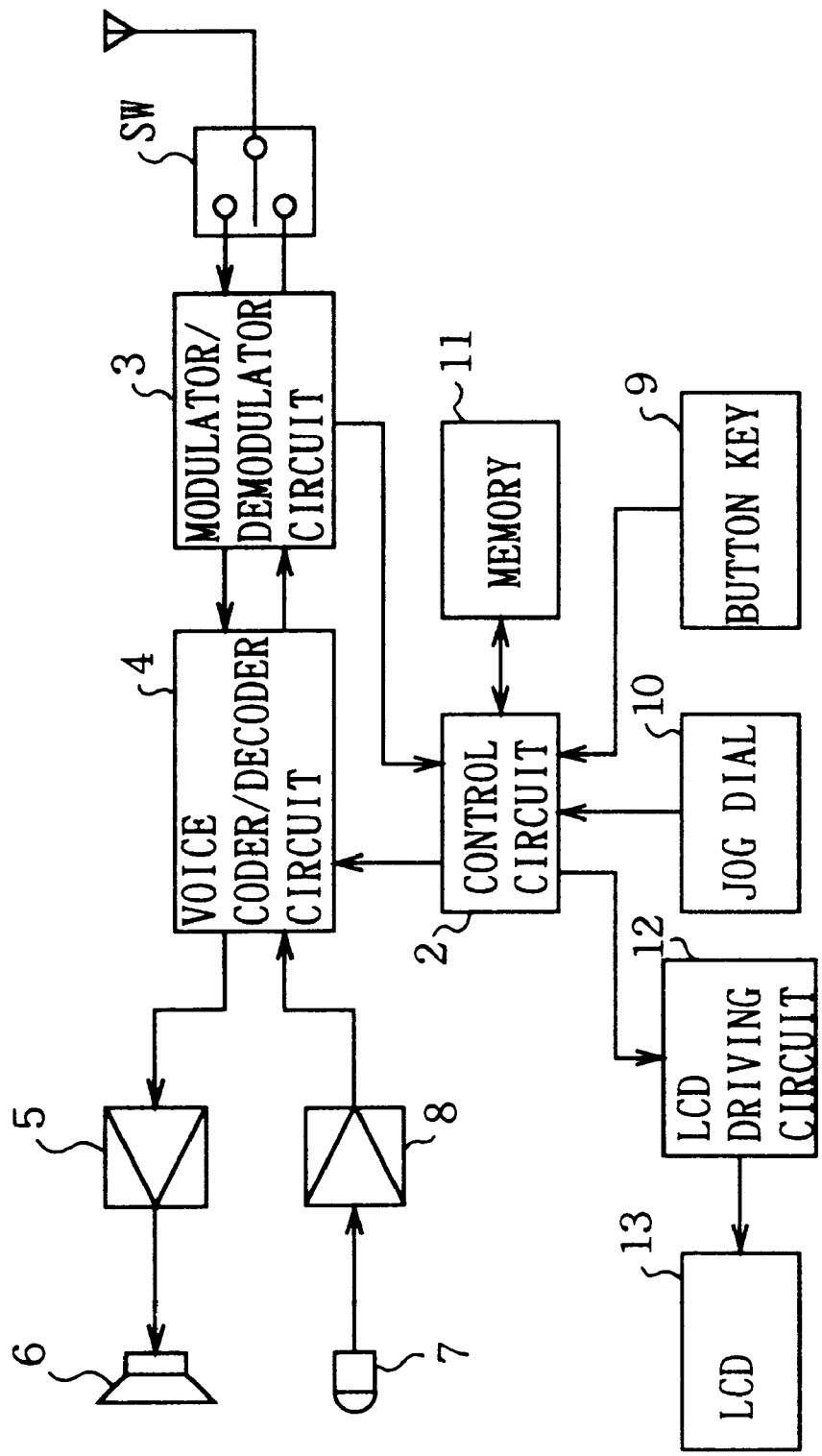
FIG. 1 is a block diagram showing an example of a portable communication terminal device according to this invention.

FIG. 1 shows a portable telephone 1 as an example of a portable communication terminal device according to this invention.

The portable telephone 1 is structured around a control circuit 2. The control circuit 2 has a microprocessor structure and the circuit 2 controls internal circuits such as a modulator/demodulator circuit 3 and a voice coder/decoder circuit 4.

When receiving signals, the modulator/demodulator circuit 3 operates to input a signal of a radio frequency band which is received by an antenna via a switch SW, and output the modulated signal to the voice coder/decoder circuit 4. In this case, the voice coder/decoder circuit 4 decodes the demodulated signal to a voice signal and outputs it to a speaker 6 via an amplifier 5.

When transmitting signals, the voice coder/decoder circuit 4 operates to code a voice signal inputted through a microphone 7 and an amplifier 8 and output it to the modulator/demodulator circuit 3. In this case, the modulator/demodulator circuit 3 modulates the inputted voice signal to a signal of a radio frequency band to be transmitted radiates via the switch SW and the antenna.

Note that, the portable telephone 1 is provided with an electronic mail function capable of transmitting and receiving a comparatively simple sentence in addition to entering the telephone number and the name of the other parties to a telephone book. A button key 9 and a jog dial 10 are used for inputting letters and numerals in operating these functions.

The button key 9 is composed of several push button keys in addition to ten numeral keys "0" to "9".

In case of this embodiment, a plurality of alphabets are allocated to eight numeral keys "2" to "9" respectively, excepting "0" and "1" from ten numeral keys "0" to "9" constituting the button key 9, so that alphabets can be inputted with these keys. For example, "a" to "c" are allocated to "2" and "d" to "f" are allocated to "3", other keys are similar to those.

Note that, to input alphabets, the numeral key to which letters are allocated may be pushed a few times. For example, when inputting "a", the numeral key "2" is pushed once, and when "b", the numeral key "2" is pushed twice, similarly, when "c", the numeral key "2" is pushed three times.

On the other hand, the jog dial 10 is composed of a circle member which is free in rotation in the circumference direction (A–B) and also slidable in the radial direction (C–D) and the switch SW. The circle member is a rotary encoder 10A in which two circle boards are fixed and formed on a slide board, not shown in the figure, the two circle boards are composed of surfaces on which an electrode pattern is formed and are facing each other. In this case, the slide board is ordinarily pushed toward the direction of an arrow C by the force of a spring, and slides to close the electrode of the switch SW only when the user pushes the jog dial 10 in the radial direction.

The user can make a line by moving the cursor upward and downward and a letter by turning the jog dial 10 in the circumference direction. Also, the user can determine the selection of function by pushing the jog dial 10 in the radial direction and determine the input of letter.

Note that, the information which is inputted and selected by means of the button key 9 and the jog dial 10 is stored in a memory 11.

Figure 3:
FIG. 3 is a schematic diagram showing an example of a fixed sentence.

In case of this embodiment, the memory 11 is used not only for storing the above information but also for storing a fixed sentence for electronic mail. In this case, a fixed sentence stored in the memory 11 is a sentence often used in forming an electronic mail, and so it is arranged such that a letter sequence formed by the user can be inserted easily into a specified position. FIG. 3 shows a display example of this fixed sentence. In FIG. 3, the position shown by "▽" is a position capable of inserting a sentence formed by the user. These various information sentence are displayed on an LCD device 13 which is driven by an LCD driver circuit 12.

(2) Electronic Mail Function

Figure 4:
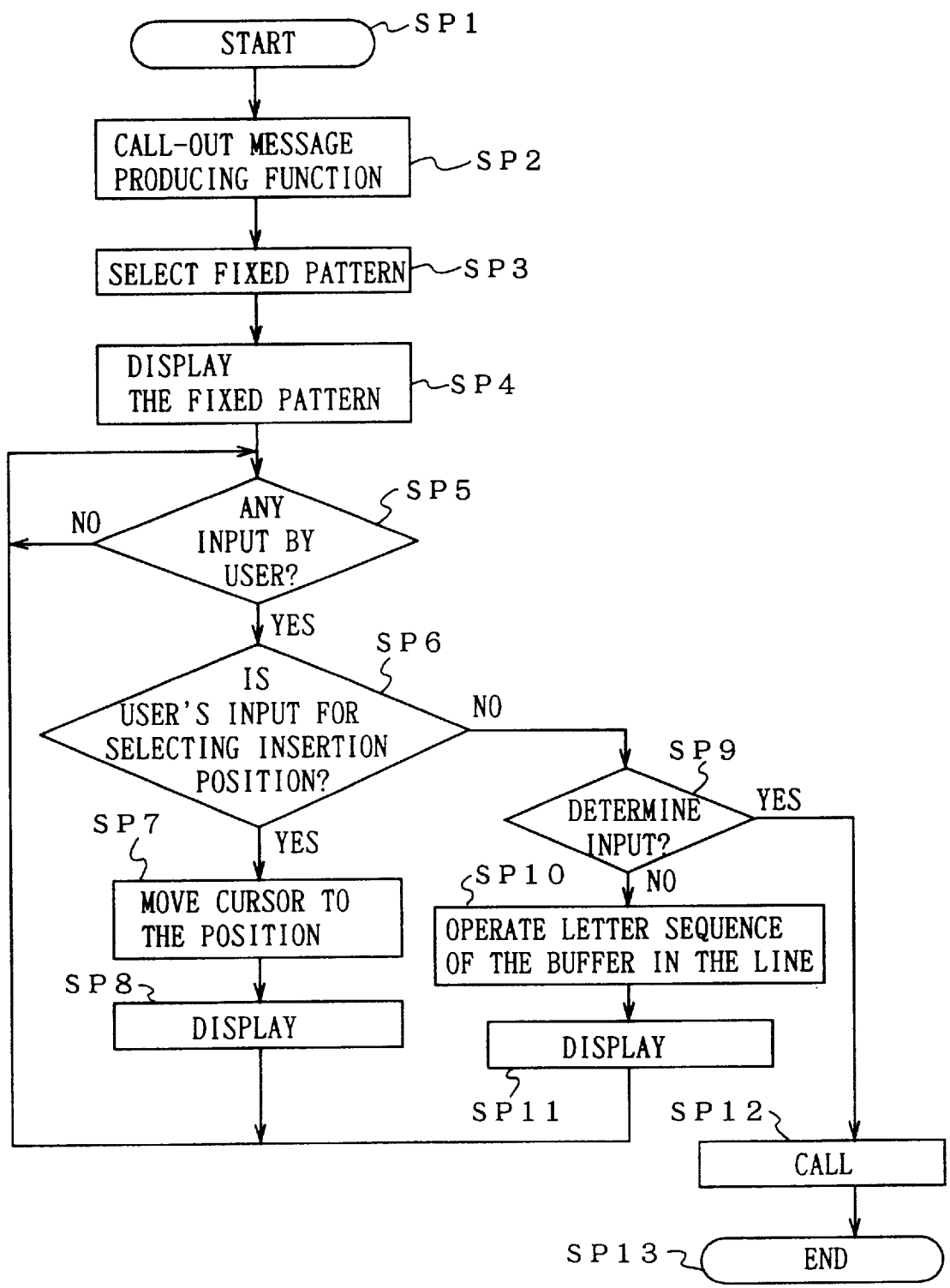
FIG. 4 is a flow chart showing the procedure when selecting an electronic mail function.

The input procedure of a transmission sentence when selecting an electronic mail function will be described hereinafter with FIG. 4.

If it is detected that the electronic mail function is selected in the situation where a function list is displayed, the control circuit 2 proceeds from step SP1 to step SP2 to call a message forming function. After starting up this message forming function, the control circuit 2 proceeds to step SP3 to switch the display to a picture for selecting a fixed sentence and waits for user selection. At this time, if the user selects one in the picture, the control circuit 2 proceeds to step SP4 to display the selected fixed sentence on the screen of the LCD device 13.

In this situation, the control circuit 2 shifts to the processing judging whether something inputted by the user in step SP5, as a result, if input is found, it proceeds to step SP6 to judge whether the contents of the input is to select an inserting position.

If the user's operation is the selection of an inserting position, the control circuit 2 obtains an affirmative result and proceeds to step SP7 to instruct the LCD driver circuit 12 to move a cursor K to the specified position.

Thereafter, the control circuit 2 proceeds to the processing of step SP8 to display the cursor K at the specified position and then returns to step SP5.

On the other hand, if the operation in step SP5 is not the selection of an inserting position, the control circuit 2 obtains a negative result in step SP6 and proceeds to step SP9 to judge whether the inputted contents is an instruction to determine the input.

If a negative result is obtained here, the control circuit 2 regards the forming of a simple sentence as being not yet finished and proceeds to step SP10 to instruct the LCD driver circuit 12 to insert the letter sequence inputted by the user into the position of the cursor K.

Then, the control circuit 2 proceeds to the processing of step SP11 to display the letter sequence inputted into the specified position and returns to step SP5.

On the contrary, if an affirmative result is obtained in step SP9, the control circuit 2 proceeds to the processing of step SP12 to transmit the formed simple sentence via the modulator/demodulator circuit 3 and then finishes the message forming function and the electronic mail function in step SP13.

(3) Display Examples

Figure 6:
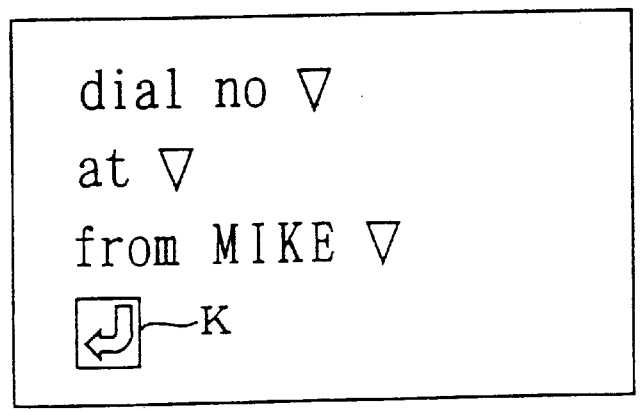
FIG. 6 is a schematic diagram showing a displayed picture when the inputting has been predetermined.
Figure 5A:
FIGS. 5A and 5B are schematic diagrams showing displayed picture when forming a transmission sentence using a fixed sentence.
Figure 5B:

FIGS. 5A, 5B, and 6 show operational examples when forming a simple sentence using the message forming function of the electronic mail function on the above structure.

If the user selects the electronic mail function in the function selecting picture, a picture for selecting a plurality of fixed sentences is displayed on the screen of the LCD device 11.

Herein, for example, if the user selects a fixed sentence asking for telephone call, the picture shown in FIG. 5A is displayed.

The user turns the jog dial 10 in the circumference direction while viewing the displayed picture to make the position of the cursor K to move, for selecting the input position of a letter sequence. FIG. 5A is an example of the case where the jog dial 10 is turned downward in the circumference direction to move the cursor K after "from".

After the position to be inserted is determined as the above, the user inputs any letter sequence with the button key 9.

In case of this example, the user inputted "MIKE". This situation in the midst of input is shown in FIG. 5B.

Here, if no more letter sequence is inputted only inputting "MIKE", the user turns the jog dial 10 downward in the circumference direction and inputs determination of the transmission sentence by moving the cursor K on an input determination mark.

After this determination of the transmission sentence, the portable telephone 1 transmits a simple sentence, "please call me/dial no/at/from MIKE", via the antenna.

According to the above structure, the user can transmit necessary information to the other party only by inputting a little letter sequence by using a fixed sentence without inputting the whole sentence of the transmission sentence. Therefore, a portable telephone 1 capable of improving its usability of the electronic mail function can be realized.

(4) Other Embodiments

In the aforementioned embodiment, it has been described about the sentence shown in FIG. 3 as an example of a fixed sentence, however, this invention is limited to this but also applicable to the other various fixed sentences.

Moreover, in the aforementioned embodiments, it is assumed that the position capable of inserting a letter sequence is only where shown by "▽" in a fixed sentence stored previously. However, a letter sequence can be inserted into the other position. Also, it can be arranged such that a letter sequence stored previously can be corrected.

Further, in the aforementioned embodiments, the case has been described wherein the input of a formed sentence is determined by moving the cursor K on the input determination mark, however, this invention is not limited to this case but can instruct the portable telephone 1 to determine the input by using the other method. For example, in the case where the telephone has an input determination key, input can be determined by pushing the key, further, input can be determined by pushing the jog dial 10 in the radial direction. Moreover, if the cursor K is movable to anywhere in the document, input can be determined by selecting a position of the other than "▽" with the cursor K.

Figure 2:
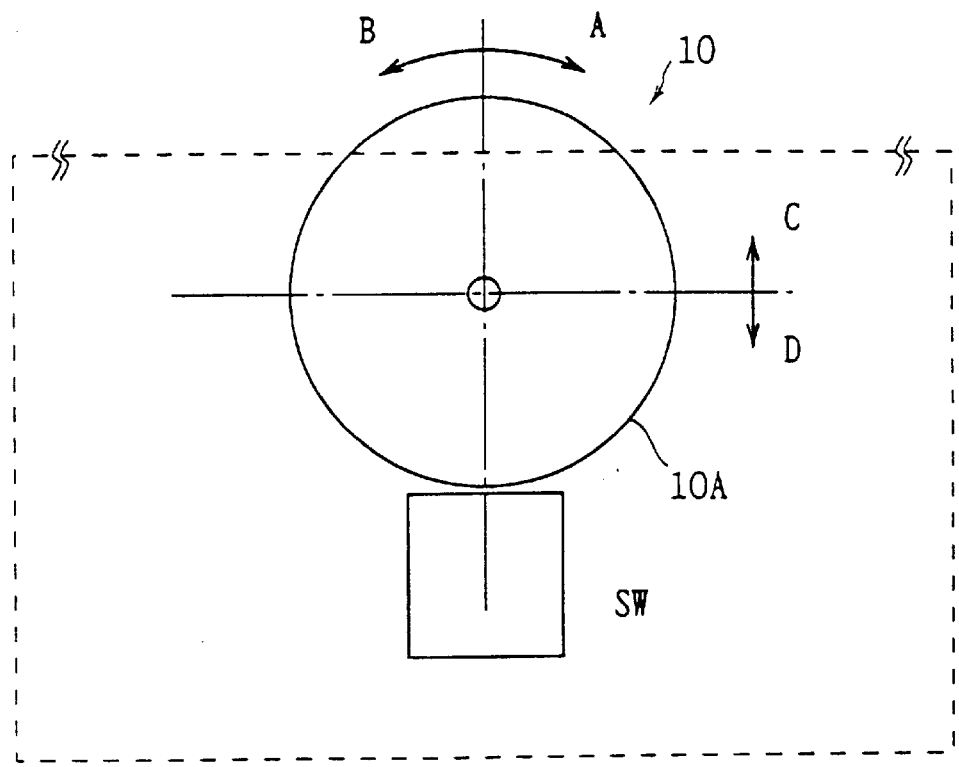
FIG. 2 is a schematic diagram showing a structural example of a jog dial.

In the aforementioned embodiments, the case has been described the jog dial 10 having a structure as shown in FIG. 2 is used, however, this invention is not limited to this case but also is applicable to a jog dial having other structure. Further, a shuttle key which always returns to a neutral position when leaving hand from the key in turning operation in the circumference direction can be used instead of the jog dial 10.

In the aforementioned embodiments, the case has been described wherein the button key 9 and the jog dial 10 are provided as input means in the portable telephone 1, however, this invention is not limited to this case but is also applicable in the case where either of the key and dial is provided, more specifically, it is applicable to both, a portable telephone 1 having only the button key 9 as an input means and a portable telephone 1 having only the jog dial 10 as an input means.

In the aforementioned embodiments, the LCD device has been described as a display means, however, this invention is not limited to this but also applicable to the case where the other display means is used.

Also, in the aforementioned embodiments, a portable telephone was described as an example of a communication terminal device, however, this invention is not limited to this but also applicable to a communication terminal device such as a portable information terminal.

As described above, according to this invention, when forming an electronic mail, a transmission sentence can be completed only by adding any letter sequence to a part of the selected fixed sentence, thus the transmission sentence can be formed speedy and easily.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A portable communication terminal for transmitting text data, comprising:

input means formed on a front surface of the portable communication device for selecting an operational mode of said portable communication terminal and for entering alphanumeric symbols, said input means including a plurality of keys for use by a user to enter said alphanumeric symbols and a jog dial having a switch and a spring for spring-biasing said jog dial away from said switch, wherein said jog dial is rotatably mounted on said front surface so as to rotate in a plane parallel to said front surface and said jog dial is slidably mounted on said front surface to slide in a radial direction toward said switch for activating said switch;

display means for displaying said alphanumeric symbols and a cursor;

storage means for storing a plurality of pre-programmed pattern sentences having predetermined user input insertion points set therein; and control means for controlling said display means to display one of said pre-programmed pattern sentences selected from said plurality of pre-programmed pattern sentences by a user using said jog dial, for inserting said alphanumeric symbols only at said predetermined user input insertion points in said selected pre-programmed pattern sentences being displayed, and for producing and transmitting combined edited sentences formed by said selected pre-programmed pattern sentences having said alphanumeric symbols entered by said user using said plurality of keys only at said predetermined user input insertion points.

2. The portable communication terminal according to claim 1, wherein said control means further controls said display means to display a plurality of predetermined marks at said predetermined user input insertion points, respectively, in said selected pre-programmed pattern sentences displayed on said display means.

3. The portable communication terminal according to claim 2, wherein said control means controls the insertion of said alphanumeric symbols entered by said user of said input means at a position where said predetermined mark and said cursor are superimposed.

4. The portable communication terminal according to claim 1, wherein plurality of keys are composed of push button keys.

5. The portable communication terminal according to claim 1, wherein said jog dial is a rotary encoder.

6. The portable communication terminal according to claim 1, wherein the entered alphanumeric symbols are selected by activating said switch by sliding said jog dial in said radial direction, and said alphanumeric symbols are switched by a rotation of said log dial.

* * * * *